United States Patent [19]

Siregar et al.

[11] 4,371,558
[45] Feb. 1, 1983

[54] SEMI-MOIST DOG FOOD PREPARATION

[75] Inventors: John A. Siregar, Reading; John Arkoudilos, Allentown, both of Pa.

[73] Assignee: Liggett Group Inc., Montvale, N.J.

[21] Appl. No.: 233,455

[22] Filed: Feb. 11, 1981

[51] Int. Cl.³ .......................... A23K 1/10; A23K 1/18
[52] U.S. Cl. .................................... 426/332; 426/335; 426/574; 426/635; 426/656; 426/657; 426/805; 426/271
[58] Field of Search ............... 426/805, 332, 335, 635, 426/656, 657, 574, 271, 646

[56] References Cited

U.S. PATENT DOCUMENTS

| | | | |
|---|---|---|---|
| 2,079,340 | 5/1937 | Smith | 426/805 |
| 3,202,514 | 8/1965 | Burgess et al. | 426/805 |
| 3,365,297 | 1/1968 | Burgess et al. | 426/805 |
| 3,745,021 | 7/1973 | Middlesworth et al. | 426/805 |
| 3,865,966 | 2/1975 | Coppage et al. | 426/805 |
| 3,965,259 | 6/1976 | Coppage et al. | 426/805 |
| 4,212,894 | 7/1980 | Franzen, Jr. | 426/805 |

*Primary Examiner*—Jeanette M. Hunter
*Attorney, Agent, or Firm*—Kenyon & Kenyon

[57] ABSTRACT

The process of preparing a semi-moist pet food product comprising the steps of: admixing and cooking ground meat or meat by-products with water, propylene glycol, phosphoric acid and one or more acids selected from the group consisting of fumaric acid and succinic acid, the admixture being a substantially soupy consistency; and, further admixing and cooking therewith water non-gellatinous absorbent ingredients in sufficient proportion to render the admixture a semi-moist relatively solid mass.

7 Claims, No Drawings

SEMI-MOIST DOG FOOD PREPARATION

This invention relates to the preparation of semi-moist dog food preparations. More particularly, the invention relates to semi-moist dog food preparations which are precooked in a liquid medium and thereafter cooked in the presence of water absorbing agents which results in semi-moist products which are stable to microbial attack.

U.S. Pat. No. 4,158,706 describes precooking meat in the frozen state and thereafter finally cooking it in the presence of acids and gelatinizing thickening agents. During the cooking steps, the meat product is in a semi-moist solid gelatinized form. The meat product made by this process is in the form of a gel which is formed into patties or other formed particles. The present invention avoids the use of gel thickening agents, and while precooking the meat product, it is in a fluid or liquid consistency.

In the process of this present invention sufficient water is added during the cooking steps to provide a final product having a moisture content in the range of about 38 to 52% water by weight. It has been found that the total amount of water is preferably admixed with ground meat, propylene glycol, edible antibacterial acids such as fumaric acid, succinic acid and phosphoric acid during the initial cooking step. Additional ingredients compatible with a liquid environment such as fat, salt and corn syrup may also be added during the first cooking step. This admixture is cooked for approximately 15 minutes in the range of about 200° F.

Under the acidic conditions of the initial cooking step, the admixture is of a soupy consistency and results in effectively destroying bacteria. After the initial cook has been completed a soy flour such as texturized soy protein may be added, together with other water absorbents such as dried beet pulp, soy bean hulls, peanut hulls, rice hulls, wheat fibers and the like. These dry materials substantially absorb the water from the soupy mixture and the product takes on the appearance of a semi-moist solid product. Cooking at the 200° F. level is continued for another 15 minutes after which time the product is cooled.

The final product appears relatively dry but contains approximately 40-50% water. It is loose and crumbly; it does not have a gelled consistency. Neither thickening agents nor gelling agents are added to the product. At the end of the second cooking period the product is cooled to between about room temperature at 85° F., delumped if necessary, and packaged in moisture-proof containers. The product may then be stored at room temperature; it is not susceptible to bacterial or other micro-organism attack.

The first cooking step in an acid medium results in a faster destruction of micro-organisms present in the meat, and the total cooking time of 30 minutes at 200° F. is sufficient to reduce the microbial populations to very low levels. In this process, molds and yeast are destroyed and lactic acid producing, as well as pathogenic bacteria are completely eliminated. *Staphylococcus aureus* is also inhibited by the addition of potassium sorbate and propylene glycol.

The finished product has a pH of about 4.3 and at this pH most bacteria are inhibited. Potassium sorbate inhibits the growth of molds and yeast.

In the following Examples and elsewhere herein the proportions are in weight percent unless stated otherwise.

EXAMPLE 1

25 Lbs. of ground cow, 9 lbs. of ground tripe, and 10 lbs. of ground poultry by-products are admixed with 10.83 lbs. of water, 4 lbs. of propylene glycol, 0.3 lbs. of potassium sorbate, 1.5 lbs. of fumaric acid, 0.5 lbs. of phosphoric acid, 3 lbs. of tallow, 13.5 lbs. of corn syrup and about a pound of salt material such as sodium chloride and potassium chloride. The admixture is heated in a steel jacketed vessel and continuously mixed at about 200° F. for 15 minutes. The admixture has the appearance of a liquid soupy mass. After 15 minutes, 11 lbs. of texturized extruded soy protein material sold under the trademark of TVP by ADM Company is added, together with 5 lbs. of dried beet pulp and 5 lbs. of soy protein concentrate. Mixing and heating at about 200° F. is continued for another 15 minutes. The admixture is no longer soupy in appearance, but rather is a solid semi-moist mass which does not have a thickened or gelatinized look or feel to it.

The product is thereafter cooled to room temperature of about 70° F., delumped and poured as a free-flowing semi-moist granulated material into moisture-proof packages. After sealing, the packages are stored at room temperature. The moisture content of the final product is approximately 40%.

EXAMPLE 2

The process of Example 1 is repeated except that the ground tripe is eliminated, 6 lbs. of ground poultry by-products are added, 27.25 lbs. of water are added, and 0.5 lbs. of soybean oil, and 7.5 lbs. of corn syrup are added to the initial cooking mixture. The other ingredients are in the same proportions as in Example 1. The first cooking step is carried out as in Example 1 and thereafter the secondary ingredients are added, except that 2 lbs. of dried beet pulp and 9.68 lbs. of soy protein concentrate are added prior to the second cook. The admixture is maintained at about 200° F. for another 15 minutes. The soupy liquid of the admixture of the first cook is converted into a semi-moist mass which is crumbly but slightly wetter in appearance than the mass of Example 1. After completion of the second cook the material is cooled to about 75° F., delumped and packaged in moisture-proof containers. The moisture content of the final product is approximately 50%.

The meat content of the product may be varied between approximately 10% and 45% beef, chicken, tripe or other by-products. The proportion of propylene glycol is up to 4%. The fumaric and succinic acids may be added in proportions to between about 0.5% to 3% of the weight of the product, approximately 1.5% being preferred. The texturized soy is added in proportion of between about 5-20% and the corn syrup is added in proportion of between about 5-20% by weight. Potassium sorbate is between 0.1-1%.

It has been found that the two-step cooking process described and claimed herein permits more rapid and more effective destruction of micro-organisms since the initial kill of such micro-organisms takes place in a virtual liquid environment at a low pH and at relatively high temperatures. Under these conditions the destruction of the micro-organisms is more efficient than if the cooking were to take place in a relatively more solid environment.

The time and temperature of each cooking step may be varied. However, the lower the cooling temperature, the longer the cooking time should be in order to effectively reduce microbial attack on the final product while being stored at room temperature. For example, the cooking temperature may be reduced to about 180° F. (or lower) and the cooking time is increased to about 30 minutes (or greater), or a cooking temperature of about 210° F. may correspond to a cooking time of 10 minutes.

It will be understood that it is intended to cover all changes and modifications of invention herein chosen for purpose of illustration which do not constitute departures from the spirit and scope of the invention.

We claim:

1. The process of preparing a cooked semi-moist pet food product comprising the steps of:
   (a) admixing and cooking ground meat or meat by-products with water, propylene glycol, phosphoric acid and one or more acids selected from the group consisting of fumaric acid and succinic acid, said cooking step being carried out at a temperature in the range of between about 180° F. and 210° F. for times corresponding to about 30–10 minutes, and said cooked admixture being a substantially soupy consistency; and,
   (b) further admixing and cooking therewith non-gellatinous water absorbent ingredients in sufficient proportion to render the admixture a free-flowing semi-moist relatively solid mass, and said cooling step being carried out at a temperature in the range of between about 180° F. and 210° F. for times corresponding to about 30–10 minutes;
   and wherein the proportion of water in said product is between about 38% and 52% by weight.

2. The process of claim 1 wherein corn syrup is admixed therewith.

3. The process of claim 1 wherein said first cooking step is at 200° F. for 15 minutes and second cooking step is at 200° F. for 15 minutes.

4. The process of preparing a cooked semi-moist pet food product comprising the steps of:
   (a) admixing and cooking the following ingredients in the proportinal range indicated for about 15 minutes at about 200° F.:

| ground meat or meat by-products | 10–40% |
   | water sufficient for final product | 40–50% |
   | propylene glycol | up to 4% |
   | potassium sorbate | .1–1% |
   | fumaric or succinic acid | .5–3% |
   | phosphoric acid | sufficient for pH 4.3 | said cooked admixture being a substantially soupy consistency;
   (b) further admixing and cooking therewith the following non-gellatinous ingredients in the proportional range indicated for about 15 minutes at about 200° F.:

| texturized soy protein | 5–20% |
   | dried beet pulp | 2–5% |
   | soy protein concentrate | 2–10% |

(c) cooling said admixture; and,
   (d) packaging said cooled admixture while in its free-flowing semi-moist granulated form in relatively moisture-proof containers,
   and wherein the proportion of water in said product is between about 40% and 50% by weight.

5. The process of claim 4 including the addition of corn syrup in proportions of 5–20%.

6. The product of the process of claim 2.

7. The product of the process of claim 5.

* * * * *